(12) United States Patent
Wang et al.

(10) Patent No.: US 8,666,907 B1
(45) Date of Patent: Mar. 4, 2014

(54) RULE-BASED AUTOMATED RETURN AUTHORIZATION

(75) Inventors: Weinan Wang, Bellevue, WA (US);
Aaron D. Kujat, Issaquah, WA (US);
Zhiyu Zhang, Seattle, WA (US); Zijiang Yang, Seattle, WA (US); Stephen J. Sherbert, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/279,986

(22) Filed: Oct. 24, 2011

(51) Int. Cl.
*G06Q 30/00* (2012.01)

(52) U.S. Cl.
USPC .......................... 705/340; 705/26.1; 705/306

(58) Field of Classification Search
USPC .................................. 705/306, 340
See application file for complete search history.

(56) References Cited

U.S. PATENT DOCUMENTS

| | | | |
|---|---|---|---|
| 6,536,659 B1* | 3/2003 | Hauser et al. ................ 235/375 |
| 6,754,637 B1* | 6/2004 | Stenz ............................ 705/26.1 |
| 7,533,042 B2* | 5/2009 | Shuder et al. .................. 705/28 |
| 7,761,381 B1* | 7/2010 | Fitch et al. ..................... 705/44 |
| 8,108,269 B2* | 1/2012 | Wechsel ......................... 705/28 |
| 8,156,007 B1* | 4/2012 | Anthony et al. ............. 705/26.1 |
| 8,356,750 B2* | 1/2013 | Hammond et al. ........... 235/383 |
| 2001/0032141 A1* | 10/2001 | Drattell ......................... 705/26 |
| 2002/0019777 A1* | 2/2002 | Schwab et al. ................. 705/26 |
| 2003/0110088 A1* | 6/2003 | Starmer et al. ................. 705/26 |
| 2004/0172260 A1* | 9/2004 | Junger et al. .................... 705/1 |
| 2005/0114221 A1* | 5/2005 | Walters et al. ................. 705/26 |
| 2006/0149577 A1* | 7/2006 | Stashluk et al. ................. 705/1 |
| 2009/0048934 A1* | 2/2009 | Haddad et al. ................ 705/17 |
| 2009/0061815 A1* | 3/2009 | Myers et al. ................. 455/406 |
| 2009/0119500 A1* | 5/2009 | Roth et al. .................... 713/100 |
| 2010/0131420 A1* | 5/2010 | Williams et al. ............. 705/340 |
| 2011/0087606 A1* | 4/2011 | Hammond et al. ........... 705/304 |

FOREIGN PATENT DOCUMENTS

EP 1667018 A2 * 6/2006

OTHER PUBLICATIONS

Weber, Steve, "Amazon Changes Marketplace Return Window to 30 Days", Nov. 7, 2006, <<http://www.weberbooks.com/selling/2006/11/amazon-changes-marketplace-return-window-to-30-days.html>>, pp. 4.*
Demery, Paul, "Completing the Circle", Jan. 4, 2006, <<http://www.internetretailer.com/2006/01/04/completing-the-circle>>, pp. 7.*
Copernicus, "Returs Processing for Viva Merchant TM", Available Dec. 7, 2004, <<http://web.archive.org/web/20040719111727/http://www.copernicusllc.com/pdf/CBS-RTRNPROC.pdf>>, pp. 59.*
IBM Websphere TM Commerce Version 6.x, "Automatic Approval for Returns", Jun. 8, 2011, <<http://web.archive.org/web/20040719111727/http://www.copernicusllc.com/pdf/CBS-RTRNPROC.pdf>>, pp. 6.*

* cited by examiner

*Primary Examiner* — M. Thein
*Assistant Examiner* — Delaine Duncan
(74) *Attorney, Agent, or Firm* — Hope Baldauff, LLC

(57) ABSTRACT

A return request processing engine automatically approves or denies requests for authorization to return a purchased item to the seller of the item. The return request processing engine utilizes return request rules to determine whether a particular return request can be approved or denied without input from the seller. When a request is received from a buyer to return an item, the return request processing engine utilizes the return request rules to determine if the request to return the item can be automatically approved or denied without input from the seller. If the return request processing engine cannot automatically approve or deny a return request, the return request processing engine causes a message to be transmitted to the seller of the item that provides a user interface through which the seller can indicate whether the return request is approved or denied by way of a single user input.

19 Claims, 12 Drawing Sheets

RULE-BASED AUTOMATED RETURN AUTHORIZATION

BACKGROUND

Customer-to-customer ("C2C") marketplaces facilitate the sale of physical and digital goods from marketplace customers to other customers. For instance, a World Wide Web ("Web") site may be configured to provide an online C2C marketplace in which customers can list items for sale. Other customers of these types of C2C marketplaces can browse items for sale and purchase these items through the marketplace. Item sellers may ship purchased items directly to buyers or may use warehouse services provided by the merchant operating the C2C marketplace to fulfill orders.

Current C2C marketplaces do not provide functionality for facilitating the return of purchased items from a buyer to a seller. As a result, buyers must typically communicate directly with marketplace sellers to facilitate the return of purchased items. For instance, if a buyer desires to return a purchased item for any reason, the buyer may be required to send an e-mail message directly to the marketplace seller requesting authorization to return the item. Sellers must manually respond to these messages with a message indicating that authorization to return a purchased item has been granted or has been denied.

High-volume C2C marketplace sellers may receive many hundreds of messages each day from buyers requesting authorization to return purchased items. Individually processing such a high volume of return authorization messages from buyers may be difficult and time-consuming for C2C marketplace sellers. It is with respect to these and other considerations that the disclosure made herein is presented.

DETAILED DESCRIPTION

Figure 1:
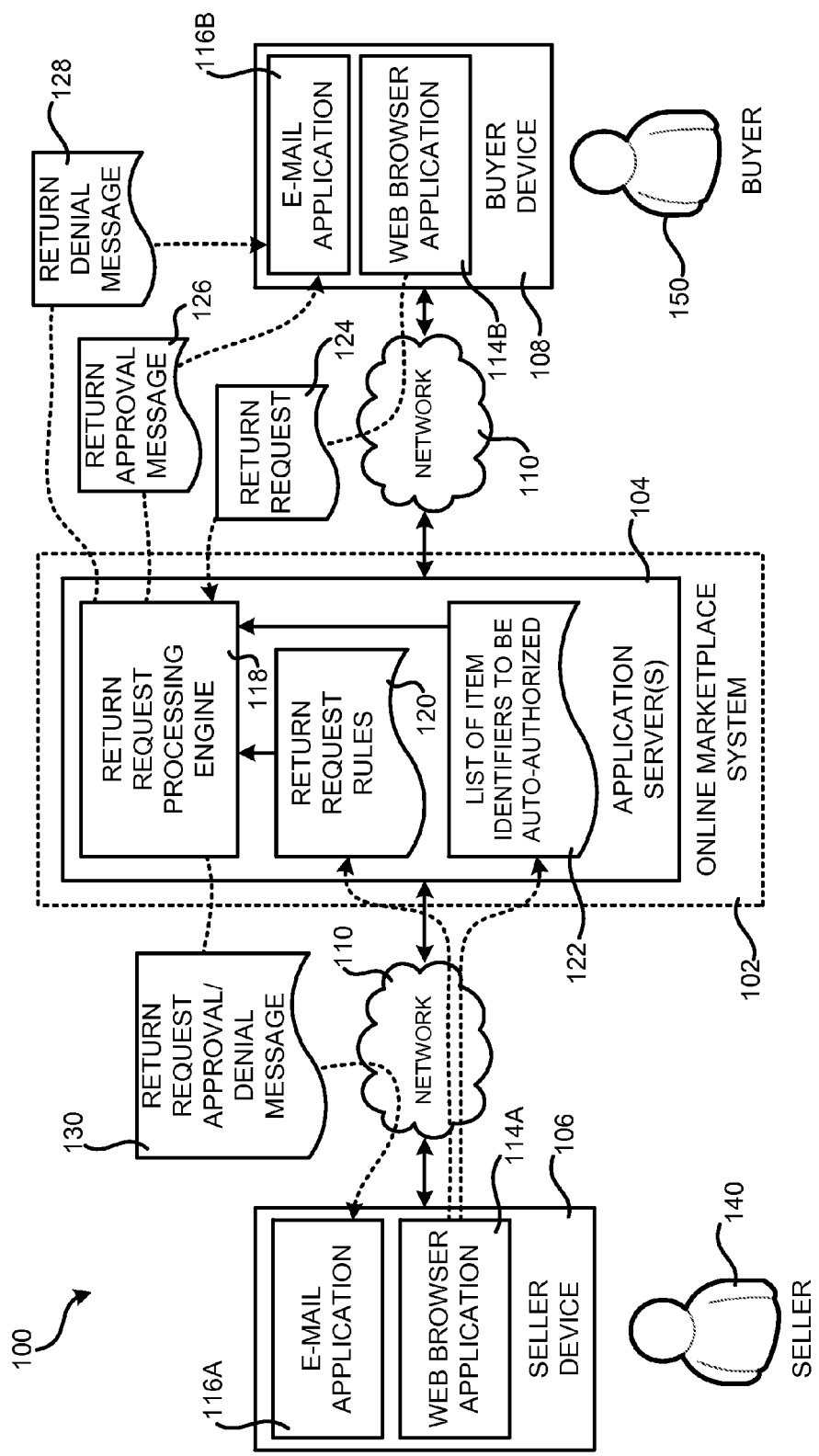
FIG. 1 is a system diagram showing aspects of an illustrative operating environment for rule-based automated return authorization, including several software and hardware components provided by embodiments presented herein.

The following detailed description is directed to concepts and technologies for rule-based automated return authorization. Utilizing the technologies described herein, a return request processing engine can utilize seller-specified return request rules to automatically approve or deny return requests without input from a marketplace seller. In this way, marketplace sellers can be freed from the burden of manually responding to every request for authorization to return an item. Additionally, in cases where the return request processing engine cannot automatically approve or deny a return request, a message can be sent to the seller for manual approval or denial of the return request that includes a user interface through which the seller can specify whether the return request is approved or denied with only a single user input operation, such as a single mouse click. In this way, sellers can quickly manually approve or deny requests to return items.

According to embodiments, a return request processing engine provides functionality for automatically approving or denying requests for authorization to return a purchased item to the seller of the item ("return requests"). The return request processing engine utilizes return request rules to determine whether a particular return request can be automatically approved or denied without input from the seller. The return request rules may be specified by the seller and may be based upon one or more factors such as, but not limited to, a shipping date of the item to be returned, the shipping weight of the item to be returned, the sale price of the item to be returned, the condition of the item to be returned, the type of the item to be returned, a marketplace policy, or other factors. The seller might also be permitted to specify a list of items for which return requests are to be automatically approved or denied. An appropriate user interface may be provided to the seller through which the return request rules can be defined.

When a request is received from a buyer to return an item, the return request processing engine is executed. The return request processing engine utilizes the return request rules to determine if the request to return the item can be automatically approved or denied without input from the seller. If the return request can be automatically approved, the return request processing engine authorizes the return of the item and causes a notification to be provided to the buyer indicating that the request has been approved. If the return request can be automatically denied, the return request processing engine denies authorization to return the item and causes a notification to be provided to the buyer indicating that the request has been denied.

If the return request processing engine cannot automatically approve or deny a return request, the return request processing engine causes a message to be transmitted to the seller of the item. The message is configured to provide a user interface through which the seller can indicate whether the return request is approved or denied by way of a single user input. For instance, when the message is displayed on a wireless mobile telephone having touch input capabilities, the seller can approve or deny the return request by providing only a single touch input on a display screen. The user interface might also include a mechanism through which the seller can add the item to the list of items for which return requests are to be automatically approved or denied.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a system diagram that shows an illustrative environment 100 for implementing the embodiments described herein for rule-based automated return authorization. According to one embodiment, the environment 100 includes an online marketplace system 102 that implements an online C2C marketplace. As described briefly above, C2C marketplaces facilitate the sale of physical and digital goods from marketplace customers to other marketplace customers. For instance, the online marketplace system 102 may provide an online C2C marketplace in which customers, such as the seller 140, can list items for sale. Other customers of the C2C marketplace, such as the buyer 150, can browse items for sale and purchase these items through the marketplace provided by the online marketplace system 102.

Item sellers may ship purchased items directly to buyers or may use warehouse and fulfillment services provided by the merchant operating the C2C marketplace to fulfill orders. Digital items might also be offered for sale through the C2C marketplace and fulfilled physically (such as in the case of CDs or DVDs) or electronically (such as in the case of digital audio or video files). It should be appreciated that although the embodiments disclosed herein are described primarily in the context of a C2C marketplace, the concepts presented herein may be utilized with other types of marketplaces, such as business-to-consumer ("B2C") marketplaces and other types of marketplaces.

In order to provide the C2C marketplace and other functionality described herein, the online marketplace system 102 may utilize a number of application servers 104 that provide various application services to sellers and customers engaged in commerce through the online marketplace. The application servers 104 may be standard server computers, database servers, Web servers, network appliances, desktop computers, other computing devices, and any combination thereof. The application servers 104 may execute a number of modules in order to provide the online marketplace services. The modules may execute on a single application server 104 or in parallel across multiple application servers in the online marketplace system 102. In addition, each module may consist of a number of subcomponents executing on different application servers 104 or other computing devices in the online marketplace system 102. The modules may be implemented as software, hardware, or any combination of the two.

According to embodiments, the online marketplace system 102 is also configured to provide functionality for assisting a buyer 150 with the return of an item purchased from a seller 140 on the C2C marketplace. For instance, a buyer 150 may utilize a Web browser application 114B executing on a buyer device 108 to connect to the online marketplace system 102 by way of the network 110. The buyer device 108 may be any type of computing device capable of connecting to the online marketplace system 102, such as, but not limited to, a desktop or laptop computer, a wireless mobile telephone, or a tablet computing device. The network 110 may be a local area network ("LAN"), a wide-area network ("WAN"), the Internet, or any other networking topology known in the art that connects a buyer device 108 and a seller device 106 to the application servers 104 in the online marketplace system 102.

Once connected to the online marketplace system 102, the buyer 150 may submit a return request 124. As described above, a return request 124 is a request for authorization to return a previously purchased item to a seller 140 and may include data identifying the item to be returned, identifying the buyer 150, indicating reasons for the requested return, and other information. Sellers typically require approval of a return request before a buyer may return an item. Consequently, if the seller 140 approves the return request 124, then the buyer 150 is authorized to return the item to the seller 140. If the seller 140 denies the return request 124, then the buyer 150 is not authorized to return the item to the seller 140.

As described above, current C2C marketplaces provide minimal functionality for facilitating the return of purchased items from a buyer 150 to a seller 140. As a result, buyers must typically communicate directly with marketplace sellers to facilitate the return of purchased items. For instance, if a buyer 150 desires to return a purchased item, the buyer 150 may need to send an e-mail message directly to the marketplace seller 140 requesting authorization to return the item. The seller 140 must manually respond to these types of messages with a message indicating that authorization to return a purchased item has been granted or has been denied. Manually processing return authorization messages in this manner can be difficult and time consuming, especially for high-volume C2C marketplace sellers that receive many hundreds of messages each day from buyers requesting authorization to return purchased items.

In an attempt to reduce the number of return requests that must be manually approved or denied by a seller 140, the online marketplace system 102 is configured in one embodiment to provide functionality for rule-based automated return request authorization. In order to provide this functionality, the application servers 104 are configured to execute a return request processing engine 118. As will be described in greater detail below, the return request processing engine 118 utilizes return request rules 120 specified by the seller 140 to determine whether a return request 124 can be automatically approved or denied without manual input from the seller 140.

The seller 140 may utilize a Web browser application 114A executing on the seller device 106 to access a user interface provided by the online marketplace system 102 for specifying the return request rules 120. The online marketplace system 102 might also provide a user interface for allowing the seller 140 to specify a list 122 of item identifiers for which future return requests are to be automatically approved or denied. Item identifiers may include, but are not limited to, numeric identifiers assigned to items by the merchant that operates the online marketplace system 102, stock keeping unit ("SKU") numbers, and any other data that can be utilized to uniquely identify items offered for sale. Details regarding one illustrative user interface for defining the return request rules 120 and the list 122 will be provided below with regard to FIGS. 3A-3E.

When a buyer 150 submits a return request 124 to the online marketplace system 102, the return request processing engine 118 receives the return request 124. The return request processing engine 118 then utilizes the return request rules 120 to determine whether the return request 124 can be approved or denied automatically without manual input from the seller 140. The return request processing engine 118 might also utilize the list 122 to determine if the return request 124 can be granted.

As will be described in greater detail below, the return request rules 120 might be based upon one or more factors. For example, and without limitation, the return request rules 120 might be based upon a shipping date of the item to be returned, the shipping weight, dimensions, or volume of the item to be returned, the sale price of the item to be returned, the condition of the item to be returned, the type or category of the item to be returned, a marketplace policy specified by the merchant that operates the online marketplace system 102, the reason for the return, the location of the buyer 150, or other factors. The seller 140 might also specify that return requests 124 for all or none of the items sold by the seller 140 are authorized for automatic approval. The seller 140 might also specify that return requests 124 received for all of the items sold by the seller should be automatically denied.

If the return request processing engine 118 determines that the return request 124 can be automatically approved, the return request processing engine 118 authorizes the return of the item and causes a return approval message 126 to be provided to the buyer 150 indicating that the return request 124 has been approved. If the return request processing engine 118 determines that the return request 124 can be automatically denied, the return request processing engine 118 denies authorization to return the item and causes a return denial message 128 to be provided to the buyer 150 indicating that the return request 124 has been denied. The return approval message 126 and return denial message 128 may be e-mail messages that the buyer 150 can retrieve using an e-mail client application 116B, may be SMS messages, or may be other types of messages.

If the return request processing engine 118 cannot automatically approve or deny a return request 124, the return request processing engine 118 might cause a message 130 to be transmitted to the seller 140 of the item. For instance, the return request processing engine 118 may transmit an e-mail message to the seller 140 that can be received by an e-mail application 116A executing on the seller device 106. The return request processing engine 118 might also transmit an SMS message or another type of message to the seller 140.

The message 130 is configured to provide a user interface through which the seller 140 can indicate whether the return request 124 is approved or denied by way of a single user input. For instance, when the message 130 is displayed on a seller device 106 having touch input capabilities, such as a wireless mobile telephone, the seller 140 can approve or deny the return request 124 by providing only a single touch input on a display screen. As another example, if the seller device 106 is a desktop or laptop computer, the seller 140 can approve or deny the return request 124 by providing only a single click on a mouse or track pad. The user interface provided by the message 130 might also include user interface controls through which the seller 140 can add the item that is the subject of the message 130 to the list 122 of items for which return requests 124 are to be automatically approved or denied. Additional details regarding this user interface are provided below with regard to FIGS. 5 and 6.

Figure 2:
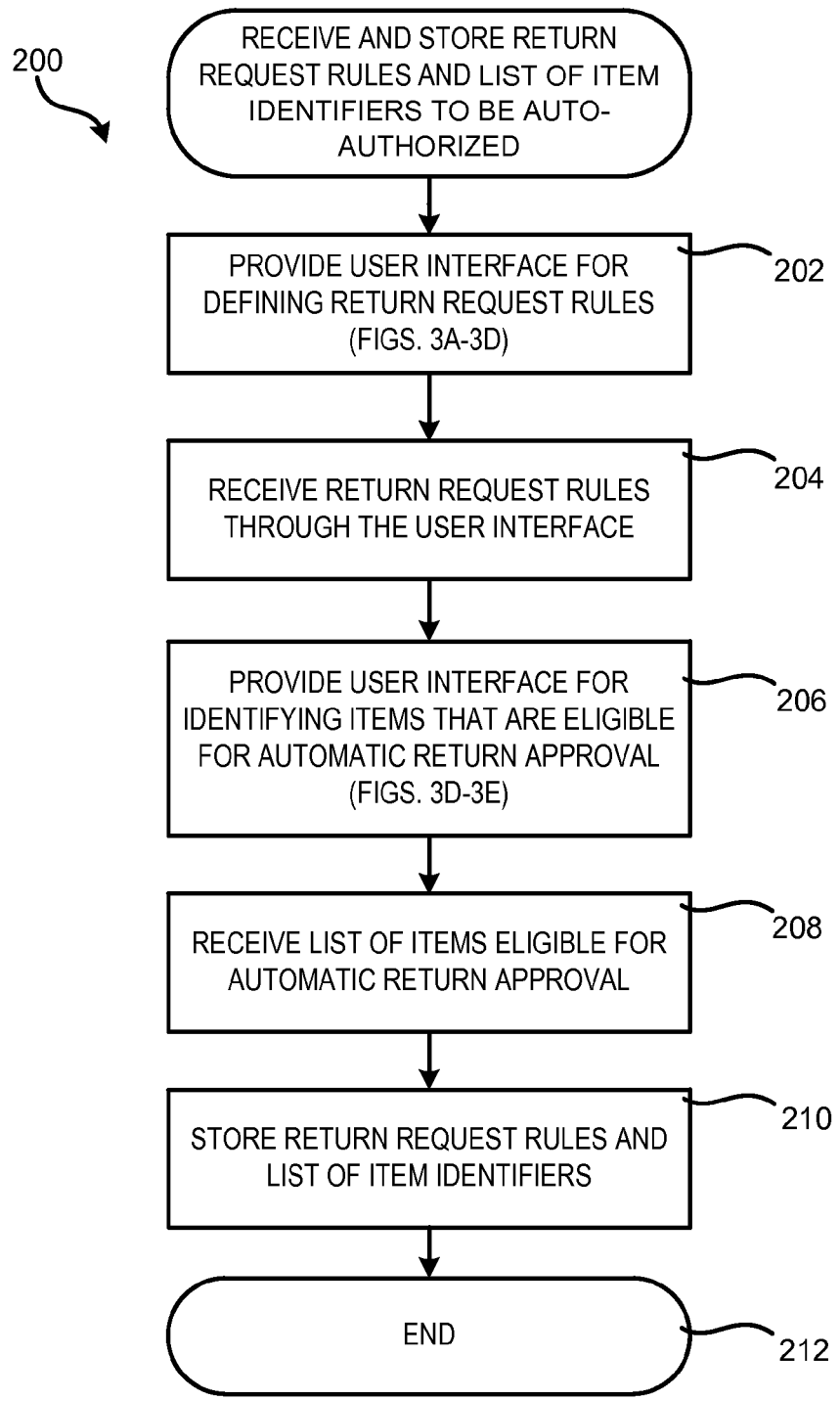
FIG. 2 is a flow diagram showing one method for receiving and storing return request rules utilized in a system capable of rule-based automated return authorization, according to embodiments described herein.

Turning now to FIG. 2, additional details will be provided regarding the embodiments presented herein for rule-based automated return authorization. It should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 2 is a flow diagram showing a routine 200 for receiving and storing return request rules 120 utilized in an online marketplace system 102 capable of rule-based automated return authorization, according to one embodiment described herein. The routine 200 is performed by the application servers 104 in one embodiment disclosed herein. It should be appreciated, however, that the routine 200 might also be performed by other modules or components executing on the application servers 104 in the online marketplace system 102, or by another combination of modules and components.

The routine 200 begins at operation 202, where the return request processing engine 118 provides a user interface for defining the return request rules 120. One illustrative user interface for defining the return request rules 120 will be described below with regard to FIGS. 3A-3D. From operation 202, the routine 200 proceeds to operation 204.

At operation 204, the return request processing engine 118 receives the return request rules 120 from the seller 140 through the user interface provided at operation 202. The routine 200 then proceeds operation 206, where the return request processing engine 118 provides a user interface for specifying a list 122 of items that are eligible for automatic return approval. The list 122 might also specify items for which return requests 124 should be automatically denied. The return request processing engine 118 receives the list 122 at operation 208. Illustrative user interfaces for specifying the list 122 and for adding items to the list 122 will be provided below with regard to FIGS. 3D and 3E, respectively.

From operation 208, the routine 200 proceeds to operation 210 where the return request processing engine 118 stores the return request rules 120 and the list 122. As will be described in greater detail below, the return request processing engine 118 utilizes the return request rules 120 and the list 122 to determine whether return requests 124 can be automatically approved or denied without manual input from the seller 140 of the item for which a return request 124 has been received. From operation 210, the routine 200 proceeds to operation 212, where it ends.

FIGS. 3A-3E are user interface diagrams showing illustrative user interfaces 300A-300E, respectively, for defining return request rules 120 according to various embodiments presented herein. It should be appreciated that the user interfaces 300A-300E are merely illustrative and that other types and arrangements of user interface controls might be utilized to permit a seller 140 to define return request rules 120 and a list 122 of item identifiers for which return requests 124 should be automatically approved or denied.

As discussed above, the seller 140 can utilize the Web browser application 114A to access the online marketplace system 102 and utilize the user interfaces 300A-300E. It should be appreciated that other mechanisms might also be utilized to specify the return request rules 120 and the list 122.

For instance, the seller 140 might be permitted to upload an extensible markup language ("XML") file or other type of structured data file that includes data defining the return request rules 120. The online marketplace system 102 might also provide other types of mechanisms through which the seller 140 can submit the return request rules 120 and the list 122.

Figure 3A:
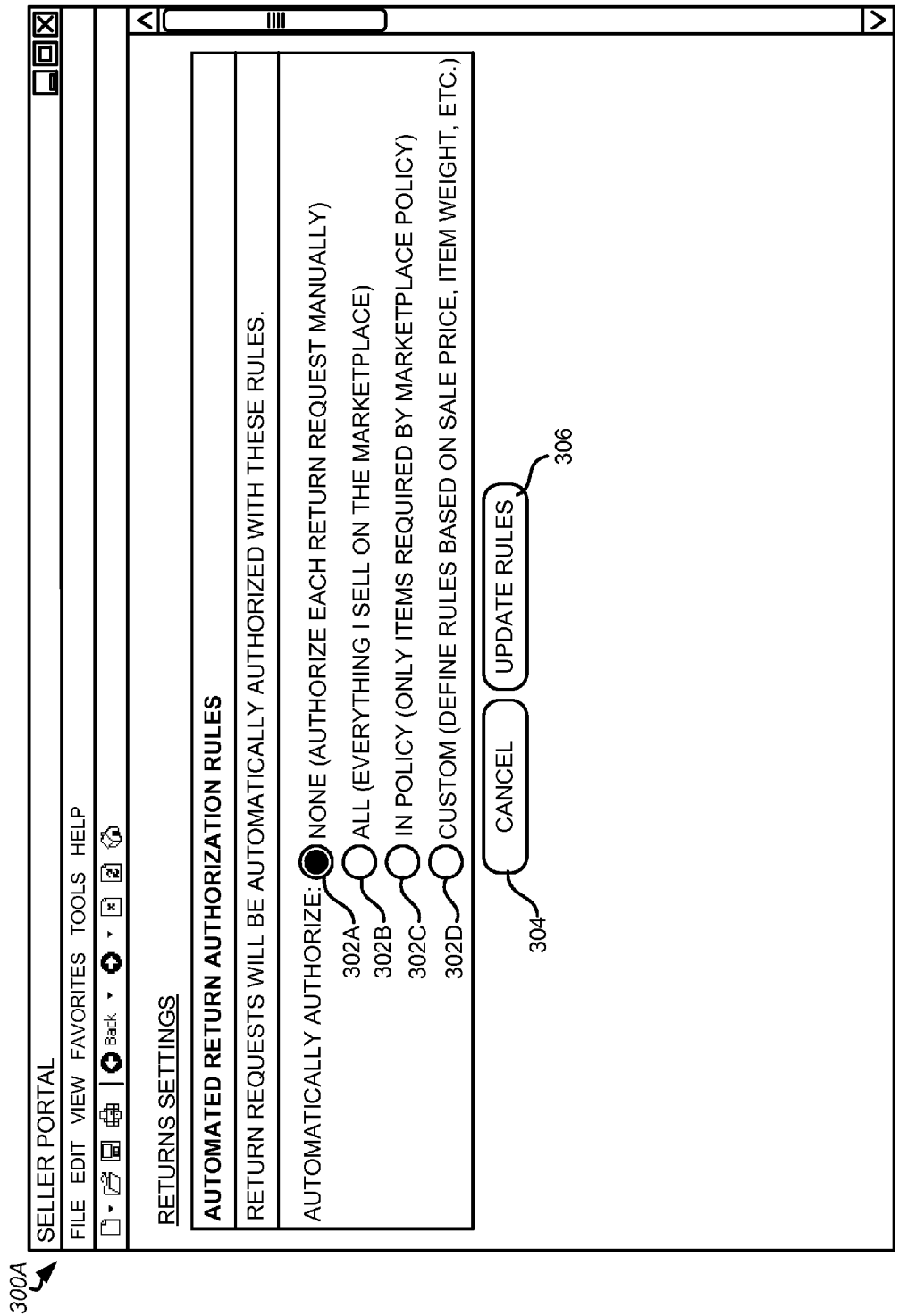
FIGS. 3A-3E are user interface diagrams showing illustrative user interfaces for defining return request rules according to various embodiments presented herein.

The illustrative user interface 300A shown in FIG. 3A includes the user interface controls 302A-302D. The seller 140 can utilize an appropriate user input device, such as a mouse, touch screen, or track pad, to select the user interface controls 302A-302D. The user interface control 302A allows the seller 140 to indicate that return requests should not be automatically authorized for any items. In this case, the seller 140 may be required to manually authorize return requests 124 for all items sold by the seller 140. The one operation user interface described below with regard to FIGS. 5 and 6 might be utilized to manually approve or deny return requests 124.

The user interface control 302B may be selected in order to indicate that return requests 124 for all of the items sold by the seller 140 on the marketplace should be automatically approved. A similar user interface control (not shown in FIG. 3A) might also be provided to allow a seller 140 to indicate that return requests 124 for all of items sold by the seller 140 should be automatically denied. In this regard, it should be appreciated that while the user interfaces 300A-300E are primarily focused upon defining return request rules 120 for the automatic approval of a return request 124, similar user interface controls might be provided to define return request rules 120 specifying how return requests 124 should be automatically denied.

Figure 3B:
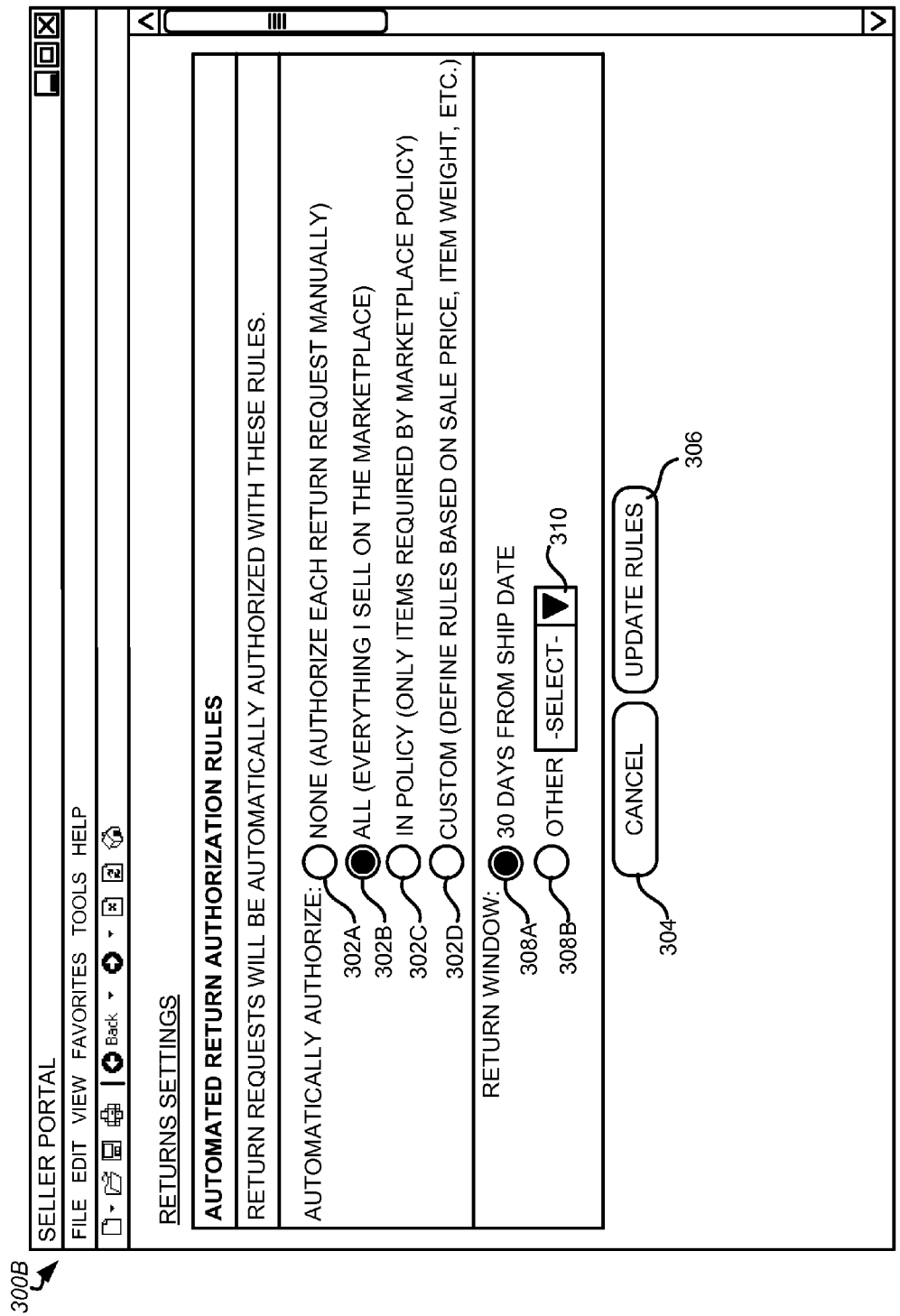
Figure 3C:
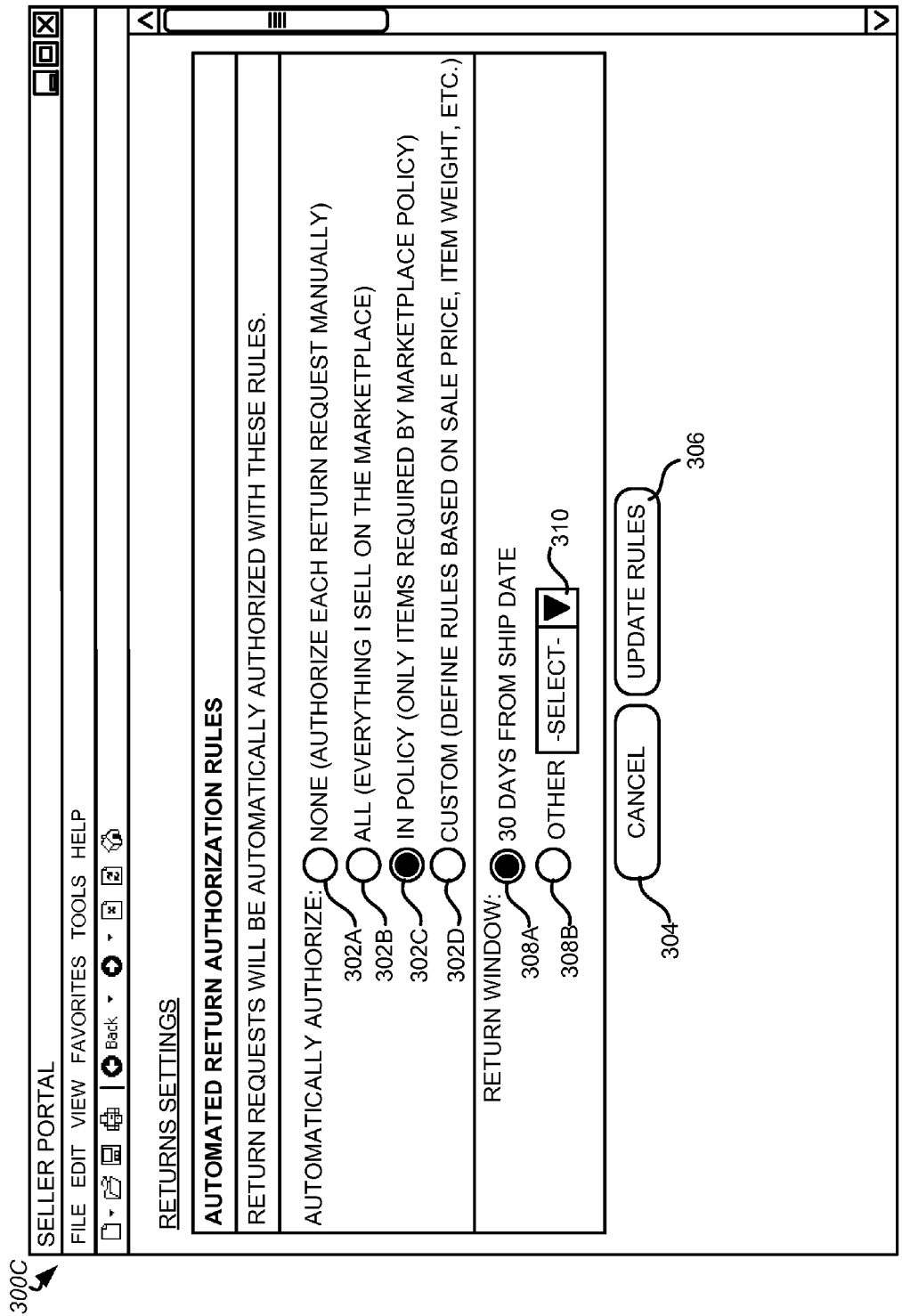

If the user interface control 302B is selected, the user interface 300B shown in FIG. 3B may be displayed. In the user interface 300B, additional user interface controls 308A, 308B, and 310 are displayed that allow the seller 140 to define a return window within which a return request 124 must be received in order to be automatically approved. For instance, the user interface control 308A may be selected in order to specify that a return request 124 must be received within 30 days of the shipping date of the item in order to be automatically approved. The user interface controls 308B and 310 might be utilized in a similar manner to specify another range of dates. In this way, the seller 140 can specify return request rules 120 indicating that return requests for all items sold by the seller 140 should be automatically approved so long as the return request 124 is received within a defined period of time.

The user interface control 302C may be selected in order to specify return request rules 120 indicating that return requests 124 should be automatically approved for items that comply with a marketplace policy specified by the merchant that operates the online marketplace system 102. For instance, the merchant that operates the online marketplace system 102 may specify certain categories of items that can be returned and certain categories of items that cannot be returned (e.g. digital items). If the user interface control 302C is selected, the return request processing engine 118 will automatically approve return requests 124 according to the marketplace policy. The seller 140 might also utilize the user interface controls 308A, 308B, and 310 shown in the user interface 300C in FIG. 3C to also specify a range of dates within which a return request 124 must be received in order to qualify for automatic approval.

Figure 3D:
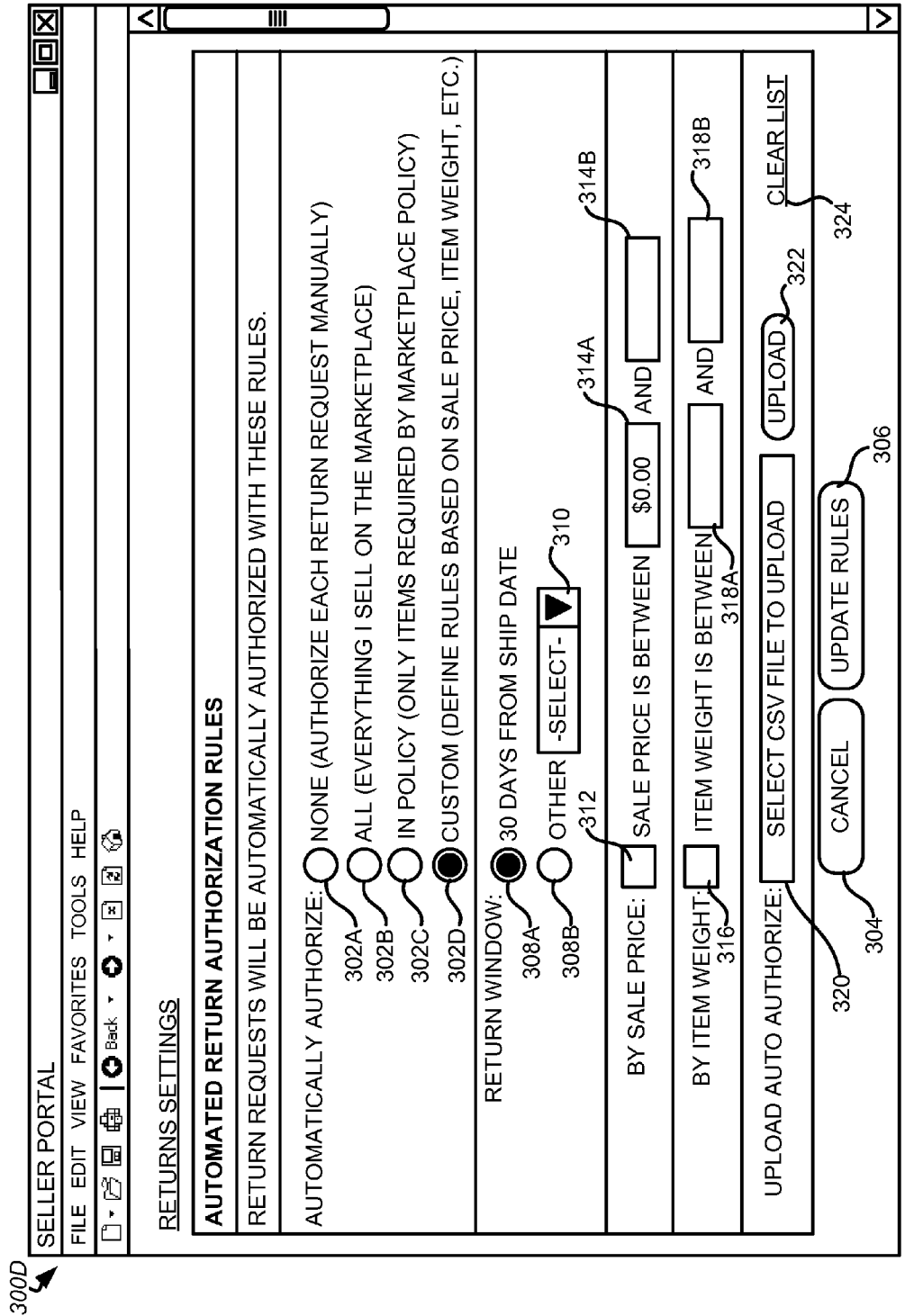

The seller 140 might also select the user interface control 302D to specify custom return request rules 120. If the seller 140 selects the user interface control 302D, the user interface 300D shown in FIG. 3D is displayed. The user interface 300D allows the seller 140 to specify return request rules 120 that are based upon various factors, such as the shipping date, sale price, and weight of the item to be returned. The user interface 300D also provides functionality for allowing the seller 140 to select and upload a list 122 of items for which return requests 124 should be automatically approved.

The user interface controls 308A-308B and 310 may be utilized to define a window of time in which a return request 124 must be received in order to be automatically approved. The user interface controls 312, 314A, and 314B may be utilized to define a range of sale prices for items that qualify for automatic return request approval. In this way, for instance, the seller 140 might specify that return requests 124 for low priced items are to be automatically approved. The user interface controls 316, 318A, and 318B may be utilized to define a range of shipping weights for items that qualify for automatic return request approval. In this way, the seller can indicate that return requests for heavy items should not be automatically approved for example. Other user interface controls might also be provided to define return request rules 120 based upon other factors.

As mentioned above, the user interface 300D might also be utilized to upload a list 122 of items for which return requests 124 are to be automatically authorized. In the embodiment shown in FIG. 3D, the user interface control 320 may be utilized to select a comma-separated values ("CSV") file that includes identifiers for the items for which return requests 124 are to be automatically authorized. Once the CSV file has been selected, the seller 140 may select the user interface control 322 in order to upload the selected file to the online marketplace system 102. A user interface control 324 might also be provided which, when selected, will clear the list 122 stored at the online marketplace system. In this manner, the seller 140 can provide the list 122. Other user interfaces might also be provided through which the seller 140 can add or remove individual items from the list 122, such as the one described below with regard to FIG. 3E.

Once the seller 140 has completed defining the return request rules 120 using the user interfaces 300A-300D, the seller 140 may select the user interface control 306 to update the rules 120 stored at the online marketplace system 120. The seller 140 might also select the user interface control 304 to cancel the selections made using the user interfaces 300A-300D. As mentioned above, the user interfaces 300A-300D discussed above are merely illustrative and other types of user interfaces may be utilized to specify rules for use in automatically approving and denying return requests 124.

Figure 3E:
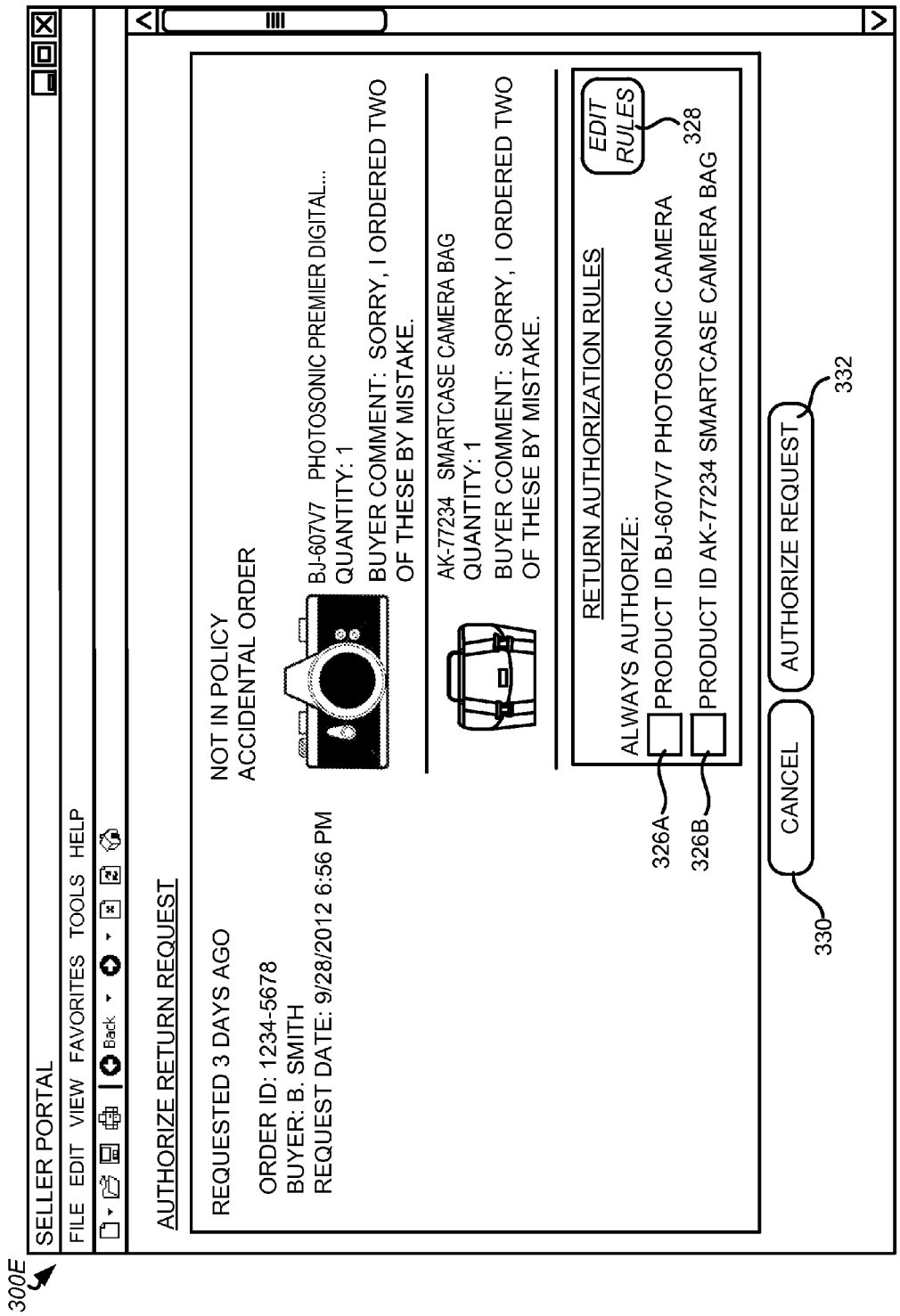

FIG. 3E illustrates one user interface 300E for adding items individually to the list 122 of items for which return requests 124 should be automatically approved. The user interface 300E may be presented to the seller 140 when the seller 140 utilizes the Web browser application 114A to access a Web page for manually approving or denying return requests 124 provided by the online marketplace system 102. In the example shown in FIG. 3D, a buyer 150 has requested to return two items, a digital camera and a camera bag.

The seller 140 can select the user interface control 332 to authorize the return of the two items. The seller 140 can also utilize the user interface controls 326A and 326B to add the two items to the list 122. By adding these items to the list 122, future return requests 124 for these items will be automatically approved by the return request processing engine 118. The seller 140 might also select the user interface control 328 in order to access a user interface for editing the return request rules 120, such as the user interfaces 300A-300D shown in FIGS. 3A-3D, respectively, and described above. The user interface control 330 might also be selected to cancel the processing of the return request 124 illustrated in FIG. 3E.

Figure 4:
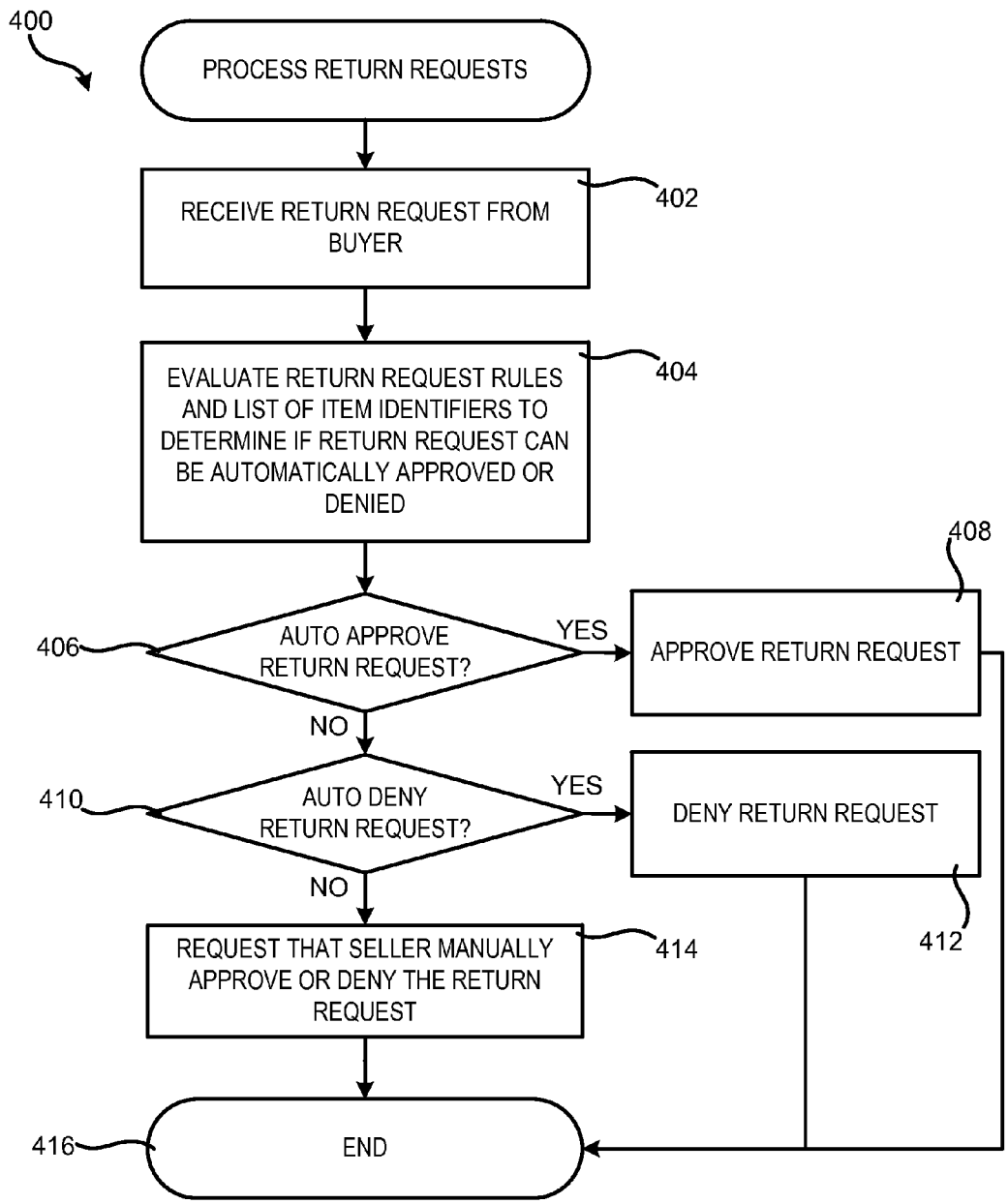
FIG. 4 is a flow diagram showing one illustrative routine for processing return requests utilizing return request rules according to one embodiment disclosed herein.

FIG. 4 is a flow diagram showing one illustrative routine 400 for processing return requests 124 utilizing the return request rules 120 according to one embodiment disclosed herein. The routine 400 begins at operation 402, where the return request processing engine 118 receives a return request 124. In response to receiving the return request 124, the routine 400 proceeds to operation 404 where the return request processing engine 118 evaluates the return request rules 120 to determine if the return request 124 can be automatically approved or denied without input from the seller 140. The return request processing engine 118 might also evaluate the list 122 to determine if the item has been specifically identified as an item for which a return request 124 should be automatically approved or denied. Once the return request processing engine 118 has completed its evaluation, the routine 400 proceeds to operation 406.

If the return request processing engine 118 determines that the return request 124 can be automatically approved, the routine 400 proceeds from operation 406 to operation 408. At operation 408, the return request processing engine 118 authorizes the return of the item and causes the return approval message 126 to be provided to the buyer 150 indicating that the return request 124 has been approved. If the return request processing engine 118 determines that the return request 124 cannot be automatically approved, the routine 400 proceeds from operation 406 to operation 410.

If the return request processing engine 118 determines that the return request 124 must be automatically denied, the routine 400 proceeds from operation 410 to operation 412. At operation 412, the return request processing engine 118 denies authorization to return the item and causes the return denial message 128 to be provided to the buyer 150 indicating that the request has been denied.

If the return request processing engine cannot automatically approve or deny a return request, the routine 400 proceeds from operation 410 to operation 414, where the return request processing engine 118 causes a message to be transmitted to the seller of the item requesting manual approval or denial of the return request 124. One illustrative user interface provided by such a message is described below with regard to FIG. 5 and FIG. 6 that allows the seller 140 to approve or deny a return request 124 using only a single user input operation. From operation 414, the routine 400 proceeds to operation 416, where it ends.

Figure 5:
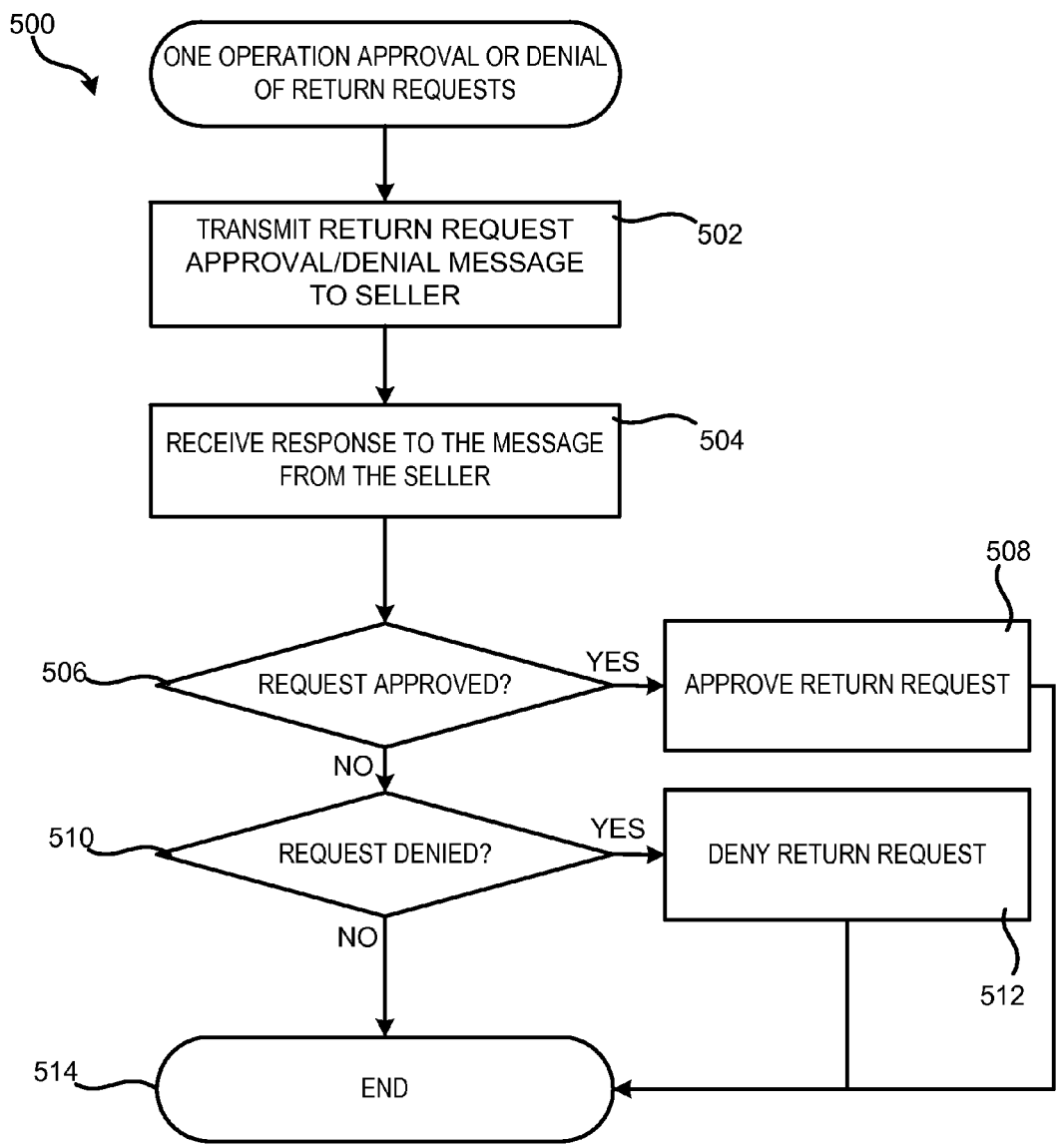
FIG. 5 is a flow diagram showing one illustrative routine for one operation approval or denial of return requests according to one embodiment disclosed herein.

FIG. 5 is a flow diagram showing one illustrative routine 500 for one operation approval or denial of return requests 124 according to one embodiment disclosed herein. The routine 500 begins at operation 502, where the return request processing engine 118 transmits a message 130 to the seller device 106 requesting that the seller 140 manually approve or deny a return request 124. As discussed above, the message 130 may be an e-mail message, an SMS message, or another type of message.

Figure 6:
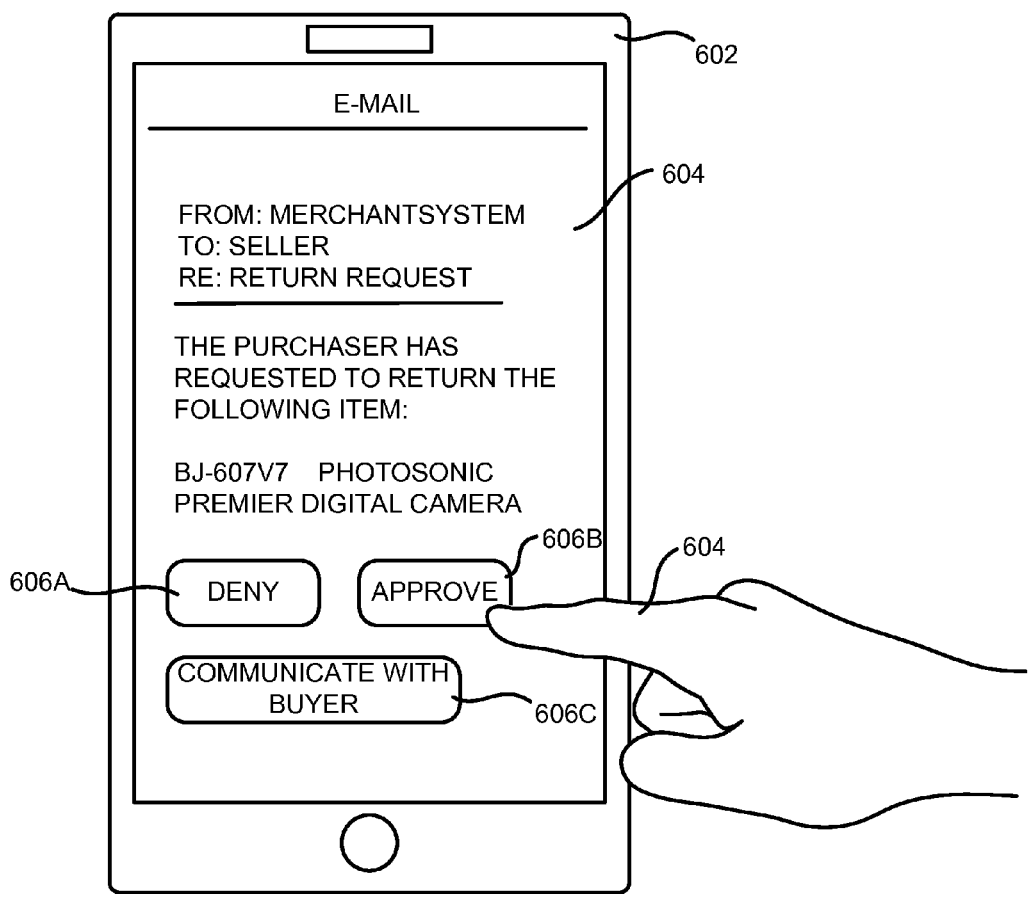
FIG. 6 is a user interface diagram showing one illustrative user interface for one operation approval or denial of return requests according to one embodiment disclosed herein.

As also discussed above, the message 130 is configured so that when the message 130 is displayed by a seller device 106, a user interface will be generated that allows the seller 140 to indicate whether the return request 124 should be approved or denied using only a single user input operation. In order to generate the user interface, the message 130 may be defined using the hypertext markup language ("HTML"), JAVASCRIPT, and/or another suitable language. FIG. 6 shows one illustrative user interface 604 for one operation approval or denial of a return request 124 according to one embodiment disclosed herein.

As shown in FIG. 6, a user interface 604 can be displayed on a seller device 106, such as the wireless mobile telephone 602, that includes user interface controls 606A and 606B for denying or approving a return request 124, respectively. The user interface controls 606A and 606B are configured such that a single user interface operation, such as a touch by the hand 604 of the seller 140, will cause a message to be transmitted to the return request processing engine 118 indicating that the return request 124 has been approved or denied by the seller 140. In this manner, a seller 140 can quickly and efficiently approve or deny return requests 124 without accessing a Web site provided by the online marketplace system 102.

According to one embodiment, the online marketplace system 102 exposes a Web service application programming interface ("API") for approving or denying return requests 124. In this embodiment, the user interface controls 606A and 606B are associated with uniform resource locators ("URLs") that call the appropriate API for approving or denying a return request 124. The APIs may also include functionality for receiving an encrypted token from the seller device 106 that includes information identifying the seller 140, identifying the return request 124, indicating whether the request has been approved or denied, and an expiration date for the token. It should be appreciated that this mechanism is merely illustrative and that other API and message-based mechanisms might be utilized in order to provide the one operation functionality described herein for approving or denying return requests 124.

Although not shown in FIG. 6, the user interface 604 might also include user interface controls, such as the user interface controls 326A and 326B shown in FIG. 3E, through which the seller 140 can add items to the list 122 of items for which return requests 124 should be automatically approved. The user interface 604 might also include a user interface control 606C which, when selected, will permit the seller 140 to send a message to the buyer 150. This functionality might be utilized, for instance, to send a message to the buyer 150 indicating why a return request 124 was denied.

It should be appreciated that the user interface 604 shown in FIG. 6 is merely illustrative and that the functionality described above for one operation approval or denial of a return request 124 might be provided by other types of user interfaces. For instance, if the seller device 106 is a laptop or desktop computer, a single mouse click might cause the return request 124 to be approved or denied.

After the message 130 has been transmitted to the seller 140 at operation 502, the routine 500 proceeds to operation 504, where the return request processing engine 118 receives a response to the message 130. If the response from the seller 140 indicates that the return request 124 has been approved, the routine 500 proceeds from operation 506 to operation 508. At operation 508, the return request processing engine 118 approves the return request 124 and transmits the return approval message 126 to the buyer 150. If the response from the seller 140 indicates that the request 124 has been denied, the routine 500 proceeds to operation 512, where the return request processing engine 118 denies the return request 124 and transmits the return approval denial message 128 to the buyer 150. From operations 508 and 512, the routine 500 proceeds to operation 514, where it ends.

Figure 7:
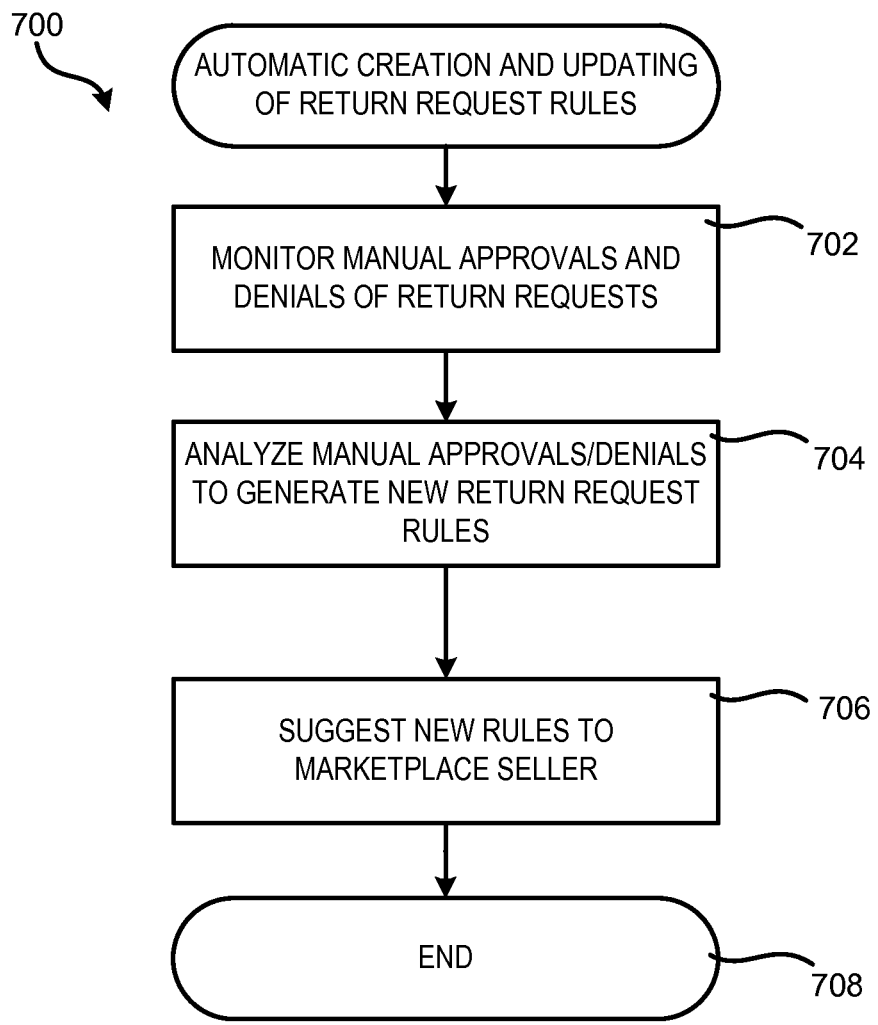
FIG. 7 is a flow diagram showing one illustrative routine for the automatic creation and updating of return request rules according to one embodiment disclosed herein.

FIG. 7 is a flow diagram showing one illustrative routine 700 for the automatic creation and updating of the return request rules 120 according to one embodiment disclosed herein. In the embodiment described in FIG. 7, the return request processing engine 118 is configured to automatically create return request rules 120 based upon the historical behavior of the seller 140 in approving or denying return requests 124. For instance, if the seller 140 historically denies all return requests 124 for items purchased more than 45 days earlier, then the return request engine 118 might create a new return request rule 120 for automatically denying return requests 124 for items purchased more than 45 days prior. Similarly, if the return request processing engine 118 determines that the seller 140 historically approves return requests for all items costing less than $10.00, then the return request processing engine 118 may create a rule 120 for approving future return requests in a similar manner.

The routine 700 begins at operation 702, where the return request processing engine 118 monitors the manual approvals and denials of return requests 124 by the seller 140. The return request processing engine 118 might also examine past historical return request approval or denials made manually by the seller 140. From operation 702, the routine 700 proceeds to operation 704.

At operation 704, the return request processing engine 118 analyzes the manual approvals and denials of return requests 124 by the seller 140 to generate new return request rules 120. The return request processing engine 118 might also modify current return request rules 120 to reflect the behavior of the seller 140 when manually approving or denying return requests 124. From operation 704, the routine 700 proceeds to operation 706.

At operation 706, the return request processing engine 118 suggests the new rules 120 and the modifications to existing rules 120 to the seller 140. An appropriate user interface may be provided by the online marketplace system 102 for suggesting the new and modified rules and for allowing the seller 140 to approve use of the new or modified rules by the return request processing engine 118. The routine 700 then proceeds from operation 706 to operation 708, where it ends.

Figure 8:
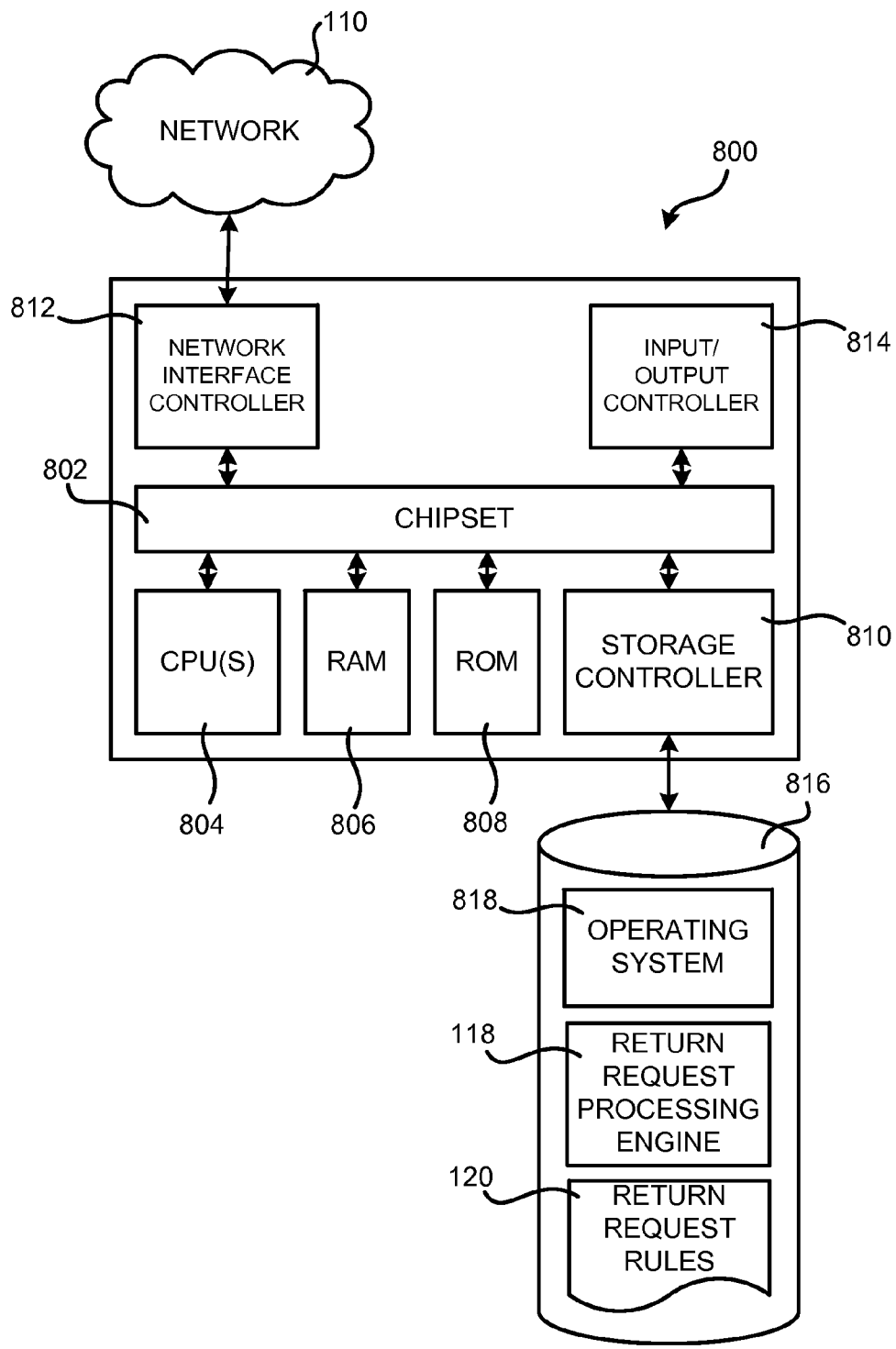
FIG. 8 is a computer architecture diagram showing an illustrative computer hardware architecture for computing devices described in embodiments presented herein.

FIG. 8 shows an example computer architecture for a computer 800 capable of executing the software components presented above for rule-based automated return authorization. The computer architecture 800 shown in FIG. 8 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 104, the seller device 106, the buyer device 108, or other computing platform.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 802. The CPUs 804 are standard programmable processors that perform arithmetic and logical operations necessary for the operation of the computer 800.

The CPUs 804 execute instructions by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 802 provides an interface between the CPUs 804 and the remainder of the components and devices on the baseboard. The chipset 802 may provide an interface to a random access memory ("RAM") 806, used as the main memory in the computer 800. The chipset 802 may further provide an interface to a computer-readable storage medium such as a read-only memory ("ROM") 808 or non-volatile RAM ("NVRAM") for storing basic routines that help to startup the computer 800 and to transfer information between the various components and devices. The ROM 808 or NVRAM may also store other software components necessary for the operation of the computer 800 in accordance with the embodiments described herein.

According to various embodiments, the computer 800 may operate in a networked environment using logical connections to remote computing devices and computer systems through the network 110, such as a local-area network ("LAN"), a wide-area network ("WAN"), the Internet, or any other networking topology known in the art that connects the computer 800 to remote computers. The chipset 802 includes functionality for providing network connectivity through a network interface controller ("NIC") 812, such as a gigabit Ethernet adapter. The NIC 812 is capable of connecting the computer 800 to other computing devices over the network 110, such as the application servers 104, the seller device 106, the buyer device 108, a data storage system in the online marketplace system 102, and the like. It should be appreciated that multiple NICs 812 may be present in the computer 800, connecting the computer to other types of networks and remote computer systems.

The computer 800 may also be connected to a mass storage device 816 that provides non-volatile storage for the computer. The mass storage device 816 may store system programs, application programs, other program modules, and data, which are described in greater detail herein. The mass storage device 816 may be connected to the computer 800 through a storage controller 810 connected to the chipset 802. The mass storage device 816 may consist of one or more physical storage units. The storage controller 810 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 800 may store data on the mass storage device 816 by transforming the physical state of the physical storage units to reflect the information being stored. The specific transformation of the physical state may depend on various factors, in different implementations of this description. Examples of such factors may include, but are not limited to, the technology used to implement the physical storage units, whether the mass storage device 816 is characterized as primary or secondary storage, and the like. For example, the computer 800 may store information to the mass storage device 800 by issuing instructions through the storage controller 810 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 816 by detecting the physical states or characteristics of one or more particular locations within the physical storage units.

In addition to the mass storage device 816 described above, the computer 800 may have access to other computer-readable storage medium to store and retrieve information, such as program modules, data structures, or other data. It should be appreciated by those skilled in the art that computer-readable media can be any available media that may be accessed by the computer 800, including computer-readable storage media and communications media. Communications media includes transitory signals. Computer-readable storage media includes volatile and non-volatile, removable and non-removable storage media implemented in any method or technology, but does not include transitory signals. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 816 may store an operating system 818 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 816 may store other system or application programs and data utilized by the computer 800, such as the return request processing engine 118 and the return request rules 120, which were described in detail above. In one embodiment, the mass storage device 816 or other computer-readable storage media may be encoded with computer-executable instructions that, when loaded into the computer 800, may transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 may have access to computer-readable storage media storing computer-executable instructions that, when executed by the computer, perform the routines 200, 400, 500, and 700 described above.

The computer 800 may also include an input/output controller 814 for receiving and processing input from a number of input devices, such as a keyboard, a mouse, a touchpad, a touch screen, an electronic stylus, or other type of input device. Similarly, the input/output controller 814 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that concepts and technologies have been disclosed herein for rules-based automated return authorization. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for rule-based automated return authorization, the method comprising performing computer-implemented operations for:

storing one or more return request rules, each of the return request rules defining one or more conditions under which a return request received from a buyer of an item can be automatically approved or denied by a return request processing engine;

receiving a return request from a buyer of an item;

in response to receiving the return request, executing the return request processing engine to determine whether the received return request can be automatically approved or denied based upon the return request rules; and in response to the return request processing engine determining that the return request cannot be automatically approved or denied, transmitting a message to a seller device that is executing an e-mail application and that is associated with a seller of the item, the message comprising data that, when displayed by the e-mail application, causes the seller device to display a user interface through which the return request is approved or denied by way of a single user input within the e-mail application, and wherein the message further comprises data that, when executed in response to the single input within the e-mail application, causes the seller device to generate an instruction for creating a new return request rule to enable automatic approval or denial of return requests for the item, the new return request rule being based upon behavior of the seller in approving or denying the return of the item.

2. The computer-implemented method of claim 1, further comprising providing a user interface through which the seller can define the one or more return request rules.

3. The computer-implemented method of claim 1, wherein one or more of the return request rules specify that no return requests are to be automatically approved or denied.

4. The computer-implemented method of claim 1, wherein one or more of the return request rules specify that return requests received for all items sold by the seller are to be automatically approved.

5. The computer-implemented method of claim 1, wherein one or more of the return request rules specify that only return requests received for items that comply with a marketplace policy are to be automatically approved.

6. The computer-implemented method of claim 1, wherein one or more of the return request rules specify that only return requests received within a specified period of time from an item ship date are to be automatically approved.

7. The computer-implemented method of claim 1, wherein one or more of the return request rules specify that return requests received for items having a sale price within a specified range are to be automatically approved.

8. The computer-implemented method of claim 1, wherein one or more of the return request rules specify that return requests received for items having a weight within a specified range are to be automatically approved.

9. The computer-implemented method of claim 1, wherein one or more of the return request rules specifies a list of identifiers for items for which return requests are to be automatically approved.

10. The computer-implemented method of claim 9, wherein the user interface through which the seller can indicate whether the return request is approved or denied further comprises one or more user interface controls through which the seller can add to the list of identifiers.

11. A non-transitory computer-readable storage medium having computer executable instructions stored thereupon which, when executed by a computer, cause the computer to:
receive a request from a buyer of an item for authorization to return the item to a seller of the item;
in response to receiving the request, to determine by way of the computer whether the request can be approved or denied without input from the seller based upon one or more return request rules specified by the seller;
in response to determining that the request can be approved without input from the seller based upon the return request rules, authorize the return of the item to the seller and provide a notification to the buyer in response to the request indicating that the return of the item has been approved;
in response to determining that the request can be denied without input from the seller based upon the return request rules, not authorize the return of the item to the seller and providing a notification to the buyer in response to the request indicating that the return of the item has not been approved; and
in response to determining that the request cannot be approved or denied without input from the seller based upon the return request rules, transmit a message to a seller device that is executing an e-mail application, the message comprising data that is rendered within the e-mail application to display a user interface through which the request is approved or denied by way of a single user input within the e-mail application, and wherein the message further comprises data that, when executed in response to the single input within the e-mail application, causes the seller device to generate an instruction for creating a new return request rule to enable automatic approval or denial of return requests for the item, the new return request rule being based upon behavior of the seller in approving or denying the return of the item.

12. The non-transitory computer-readable storage medium of claim 11, having further computer-executable instructions stored thereupon which, when executed by the computer, cause the computer to provide a user interface through which the seller can define the one or more return request rules.

13. The non-transitory computer-readable storage medium of claim 11, having further computer-executable instructions stored thereupon which, when executed by the computer, cause the computer to provide a user interface through which the seller can specify one or more item identifiers for items for which return requests should always be approved.

14. The non-transitory computer-readable storage medium of claim 11, wherein the return request rules are based upon one or more of a date upon which an item shipped, a shipping weight of an item, a sale price of an item, a type of an item, and a condition of an item.

15. A system for providing an online marketplace in which a seller can offer an item for sale to a buyer, the system comprising:
a server computer configured to
receive a request for authorization to return an item to a seller of the item,
in response to receiving the request, determine whether the request can be automatically approved or denied without input from the seller based upon one or more return request rules specified by the seller, and
in response to determining that the request cannot be automatically approved or denied without input from the seller, transmit a message to a seller device that is executing an e-mail application and that is associated with the seller of the item, the message comprising data that, when rendered by the e-mail application on the seller device, causes the seller device to display a user interface through which the request to return the item is approved or denied by way of a single user input within the e-mail application, wherein the message further comprises data that, when executed in response to the single input within the e-mail application, causes the seller device to generate an instruction for creating a new return request rule to enable automatic approval or denial of return requests for the item, the new return request rule being based upon behavior of the seller in approving or denying the return of the item.

16. The system of claim 15, wherein the user interface through which the seller can indicate whether the request to return the item is approved or denied further comprises one or more user interface controls through which the seller can add the item to a list of items for which return requests are automatically approved without input from the seller.

17. The system of claim 15, wherein the return request rules are based upon one or more of a date upon which an item shipped, a shipping weight of an item, a sale price of an item, a type of an item, and a condition of an item.

18. The system of claim 15, wherein receiving the request for authorization to return the item comprises receiving multiple requests for authorization to return multiple items to multiple sellers, and wherein transmitting the message comprises transmitting a first message to a first seller associated with a first of the multiple items and transmitting a second message to a second seller associated with a second of the multiple items.

19. The system of claim 15, wherein the message further comprises data that, when executed in response to the single input within the e-mail application, causes the seller device to generate an instruction for adding the item to a list of items for which return requests are to be automatically approved or denied.

* * * * *